H. S. McKean,
Bread Machine,

Nº 46,688.  Patented Mar. 7, 1865

Witnesses;

Inventor,
H. S. McKean
Per Munn & Co
Atty

UNITED STATES PATENT OFFICE.

H. S. McKEAN, OF ALLEGHENY, PENNSYLVANIA, ASSIGNOR TO HIMSELF AND WILLIAM H. REEL, OF SAME PLACE.

IMPROVED TROUGH FOR RAISING DOUGH.

Specification forming part of Letters Patent No. 46,688, dated March 7, 1865.

*To all whom it may concern:*

Be it known that I, H. S. McKEAN, of Allegheny, in the county of Allegheny and State of Pennsylvania, have invented a new and Improved Trough for Raising Dough; and I do hereby declare that the following is a full, clear, and exact description thereof, which will enable those skilled in the art to make and use the same, reference being had to the accompanying drawings, forming part of this specification, in which—

Figure 1:
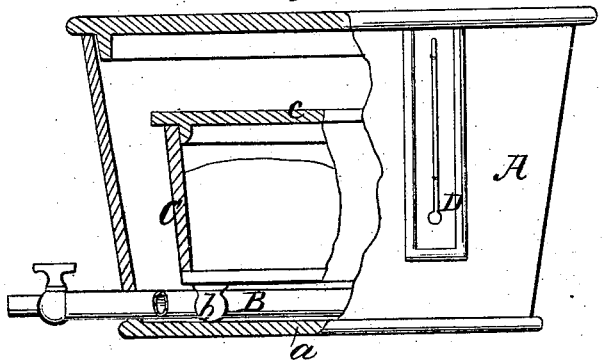
Figure 2:
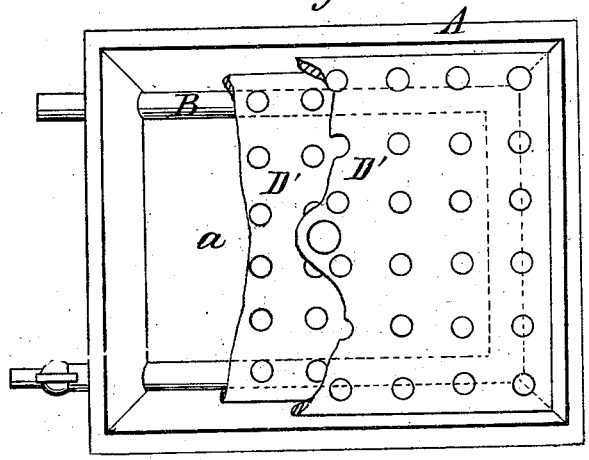

Figure 1 is a side view of my invention, partly in section; Fig. 2, a plan or top view of the same, with the lid or cover removed.

Similar letters of reference indicate like parts.

This invention is designed to facilitate the raising in cold weather of dough for bread, biscuit, &c.

The invention consists of a box or chest, A, which may be of quadrilateral form, and having flaring or inclined sides, as shown in Fig. 1. This box has a steam-pipe, B, fitted in its lower part, said pipe extending around the bottom *a* of the box at the junction of three sides thereof, the pipe entering at one corner and passing out at the opposite corner of the same end or side. (See Fig. 2.)

The steam may be procured from a small boiler of any description An ordinary tea-kettle or culinary vessel—such as a stew or dinner pot—would answer the purpose, and the steam may be conveyed from the boiler to pipe B by a flexible hose or a metal tube. An india-rubber tube would answer very well.

C represents the dough-chest, which is considerably smaller than the box A, and is placed within the latter. This chest C is provided with feet *b*, so as to elevate its bottom above the pipe B and admit of the heat passing under C, as well as around its sides and over its top. The chest C has also a close-fitting lid, *c*.

In one side of the box or chest A there is fitted a thermometer, D. By this arrangement the dough in the inner chest, C, may be subjected in a very few minutes to a temperature sufficient to cause the dough to raise properly, the temperature required being from 60° to 80°.

The thermometer is designed to avoid the contingency of the dough being overheated.

By having the heat pass all around the dough-chest C the dough will be uniformly heated throughout, whereas in the old method of placing a bread-tray near a fire one side of the tray will be hot, while the opposite side will be cold as well as the bottom, the heat at the latter part being most required; hence, considerable time elapses, frequently a whole day, before the dough is raised and ready for the baking-pans, and in consequence of this delay the bread is frequently sour, heavy, rough, and unpleasant to the taste. Bread is never good when the dough has been a long time in raising.

By the arrangement above described the operation of bread-making may be gone through in a few hours—at most in half a day—from the time of setting the "sponge" until the bread is taken out of the oven.

When the dough in the chest C is raised, the steam is shut off from the box A, the chest removed from the box, and the dough inserted in the ordinary baking-pans. One or more perforated shelves, D, are then placed in the box and the filled pans placed upon them. The lid or cover of the box A is then closed and the steam turned on, and the dough in the pans will raise nicely and be ready for the oven. This is an important feature, for if the dough be chilled while raising in the pans the bread will be inferior. During this raising of the dough in the pans, if a moist cloth be spread over it the evaporation of the moisture from the cloth will cause the bread to be baked with a thin brown crust.

This simple device may be constructed at a moderate cost, and dough can be raised by it in winter without any difficulty whatever.

I claim as new and desire to secure by Letters Patent—

1. The employment or use of a box or chest A, provided with a steam-pipe, B, arranged substantially as shown, in connection with a dough-chest, C, provided with feet or arranged in any suitable way, so that it may be fitted in A with its bottom above the steam-pipe or above the bottom of A, for the purpose of raising dough for baking, as set forth.

2. In combination with the box or chest A, heated by steam, as described, one or more perforated shelves, D, for the purpose specified.

H. S. McKEAN.

Witnesses:
S. S. SHIELDS,
ALEXANDER HAYS.